United States Patent
Smith

(10) Patent No.: US 8,369,490 B2
(45) Date of Patent: Feb. 5, 2013

(54) INCOMING CALL SCREENING, CONTROL AND PRIORITISATION IN A TELEPHONE DEVICE

(75) Inventors: Alan Andrew Smith, Farnborough (GB); Julie Stuart, legal representative, Longfield (GB)

(73) Assignee: QUALCOMM Incorporated, San Diego, CA (US)

( * ) Notice: Subject to any disclaimer, the term of this patent is extended or adjusted under 35 U.S.C. 154(b) by 488 days.

(21) Appl. No.: 10/546,098

(22) PCT Filed: Nov. 3, 2004

(86) PCT No.: PCT/GB2004/004640
§ 371 (c)(1), (2), (4) Date: Aug. 17, 2005

(87) PCT Pub. No.: WO2005/046191
PCT Pub. Date: May 19, 2005

(65) Prior Publication Data
US 2006/0182248 A1    Aug. 17, 2006

(30) Foreign Application Priority Data
Nov. 3, 2003    (GB) .................................. 0325591.6

(51) Int. Cl.
*H04M 1/64*    (2006.01)
*H04M 1/56*    (2006.01)
*H04M 3/42*    (2006.01)
(52) U.S. Cl. ................. 379/70; 379/142.06; 379/211.02
(58) Field of Classification Search ............. 379/142.06, 379/197
See application file for complete search history.

(56) References Cited

U.S. PATENT DOCUMENTS

| | | | |
|---|---|---|---|
| 5,559,860 A | 9/1996 | Mizikovsky | |
| 6,160,877 A * | 12/2000 | Tatchell et al. | ............... 379/197 |
| 6,418,211 B1 * | 7/2002 | Irvin | ............................ 379/188 |
| 6,501,420 B2 * | 12/2002 | Townsend et al. | ........ 342/357.74 |
| 2001/0017598 A1 * | 8/2001 | Townsend et al. | ......... 342/357.1 |
| 2003/0054864 A1 * | 3/2003 | Mergler | ........................ 455/566 |

FOREIGN PATENT DOCUMENTS

| | | |
|---|---|---|
| EP | 0 901 263 | 3/1999 |
| EP | 1 193 955 | 4/2002 |
| EP | 1193955 A2 * | 4/2002 |

(Continued)

OTHER PUBLICATIONS

International Preliminary Report on Patentability—PCT/GB04/004640, The International Bureau of WIPO—Geneva, Switzerland, May 8, 2006.

(Continued)

*Primary Examiner* — Joseph T Phan
(74) *Attorney, Agent, or Firm* — Nicholas A. Cole

(57) ABSTRACT

A circuit for a telephone such as a mobile radiotelephone. The circuit has a memory for storing phonebook items and for storing group attributes associated with phonebook items, a connection to a radiotelephone receiver for receiving telephone calls and calling party identifications, and a controller for selecting the disposition of received calls. An operating mode is selected (45) from a plurality of operating modes, e.g. "Personal", "emergency", "personal-plus-emergency", "all calls", "no calls", etc. A received calling party identification is compared (42) with a phonebook item, and a disposition for a received call (46, 47, 48, 49) is selected dependent on a group attribute for that phonebook item and a present operating mode.

21 Claims, 2 Drawing Sheets

FOREIGN PATENT DOCUMENTS

WO          01/35687          5/2001

OTHER PUBLICATIONS

"Compaq iPAQ Pocket PC H3800 Series Reference Guide" Sep. 2001, Compaq Computer Corporation, XP002317452.

"User's Guide Mobile Phone T28s," Ericsson Mobile Communications, XP002317450, Sep. 1999, pp. 63-64, 88-90.

"Nokia 6510 User's Guide," Nokia Corporation, XP002317451, 2001, pp. 43-44, 56-57, 62-63.

\* cited by examiner

INCOMING CALL SCREENING, CONTROL AND PRIORITISATION IN A TELEPHONE DEVICE

FIELD OF THE INVENTION

This invention relates to a telephone device, such as a wireless telephone device, capable of receiving incoming calls and selecting alternative dispositions for an incoming call.

BACKGROUND TO THE INVENTION

It is common in the mobile radio telephone field to provide a radio telephone with a memory in which telephone numbers and other data can be stored. This memory, typically known simply as a phonebook, can store a telephone number (which may be manually entered or may be received in the form of a caller ID number or from a directory service) and a corresponding name or nickname which is typically entered manually by a user through a keypad. Phonebooks are becoming a very valuable resource to telephone users and greatly facilitate ease of usage, avoiding the need for paper lists, diaries and telephone directories.

It is also common for an incoming call to be identified by means of a caller ID and for the phone book to be searched for a telephone number so-identified to help the user identify the calling party. If the received telephone number matches an entry in the phone book, the name or nickname entered in the phone book can be displayed on a display of the device and the user can decide whether to answer the incoming call or take some other action. If there is no match found for the incoming telephone number in the phone book, it is typical for the number itself to be displayed and the user thus knows that the calling party is not listed in the user's phone book.

U.S. Pat. No. 6,418,211 describes alternative dispositions for an incoming call dependent upon matching of a caller ID. That document describes two alternative modes, one in which call screening is enabled and one in which it is not. If call screening is not enabled, all calls are "accepted". If call screening is enabled, the caller ID number is captured and compared with a first list and a second list and depending upon these comparison, the call is either accepted, diverted to voicemail or rejected. This scheme provides the ability to screen incoming calls at times when the user does not wish to accept all calls. The scheme is, however, limited in its flexibility and application.

There is a need for a more flexible manner of allowing a user to control alternative dispositions for incoming calls.

SUMMARY OF THE INVENTION

According to the present invention, a circuit for a telephone is provided, the circuit having: a memory for storing phonebook items and for storing group attributes associated with phonebook items; means for receiving calling party identifications for received telephone calls, and a controller for selecting the disposition of received calls. The controller comprises means for selecting an operating mode from a plurality of operating modes, means for comparing a received calling party identification with a phonebook item, and means for selecting a disposition for a received call dependent on a group attribute for that phonebook item and a present operating mode.

The memory is preferably arranged to store phonebook items in the form of individual telephone numbers and to store plural group attributes for an individual telephone number. For a telephone number having plural group attributes, the means for selecting a disposition for a received call preferably selects a disposition in accordance with a hierarchy of prioritized dispositions.

In accordance with a second aspect of the invention, a telephone device is provided comprising a circuit as described above in combination with a radiotelephone receiver for receiving the telephone calls and the calling party identifications. The means for selecting can selectively activate an alert generator, alerting the user to the incoming call. There may be first and second alert generators for alerting a user to incoming calls, wherein the means for selecting selectively activates a selected one of the first and second alert generators. A voice recorder may be provided, selectively activated by the means for selecting.

A plurality of optional modes are preferably presented to a user through a user interface such as a display, and selection means enable the user to select and store a mode from the optional modes.

In accordance with other aspects of the invention, a method of handling incoming telephone calls in a telephone device is provided, and a computer software product for carrying out the method, as set out in the appended claims.

A preferred embodiment of the invention is now be described, by way of example only, with reference to the drawings.

DETAILED DESCRIPTION OF THE PREFERRED EMBODIMENT

Figure 1:
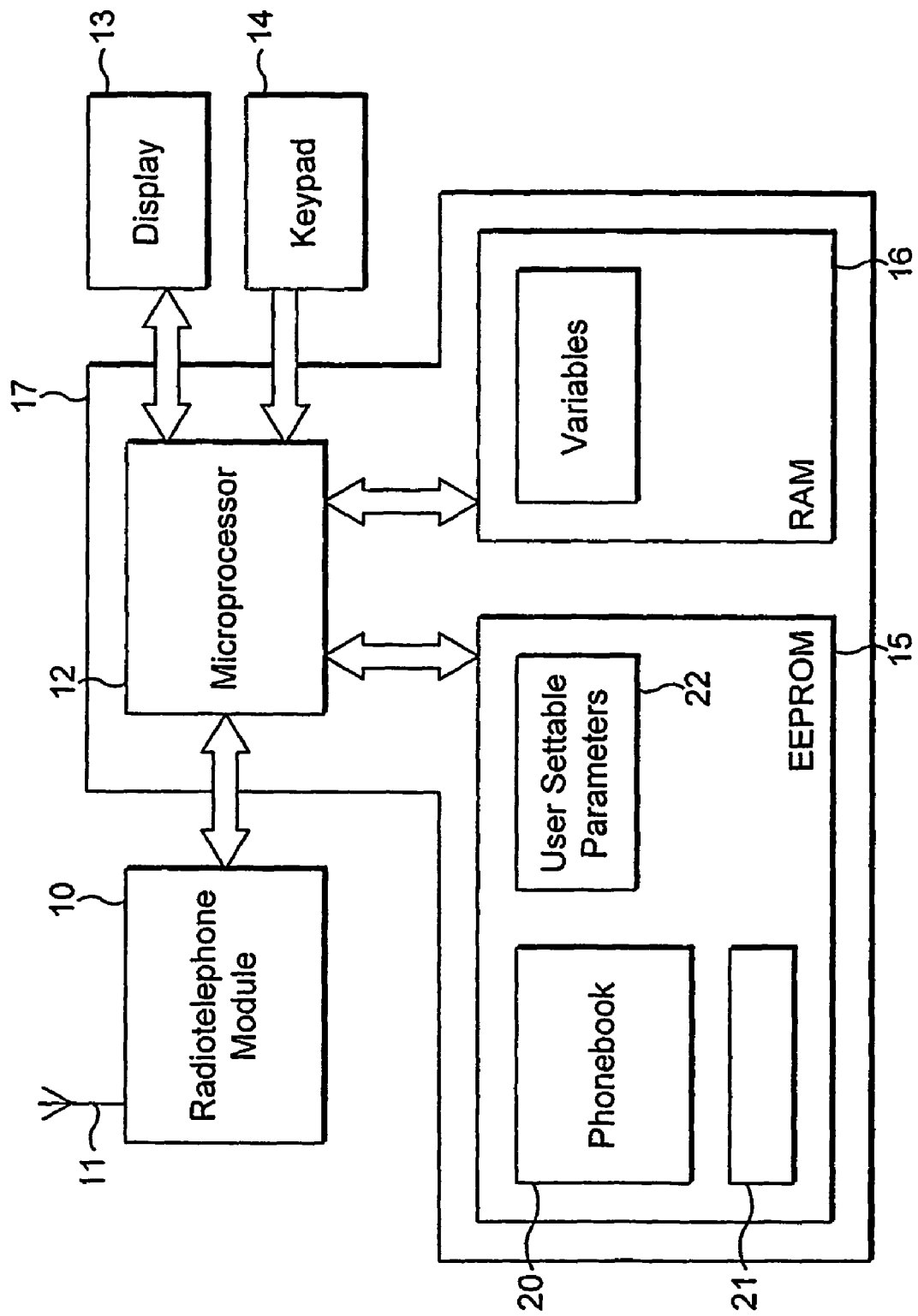
FIG. 1 is a hardware block diagram illustrating the structure of a mobile radio telephone in accordance with the preferred embodiment of the invention.

FIG. 1 illustrates a mobile radio telephone device having a radio telephone module 10 (e.g. a GSM or IS-95 standard radio module) coupled to an antenna 11 and a microprocessor 12. Coupled to the microprocessor are a display 13, a keypad 14, a read-only memory (e.g. a flash EEPROM) 15 and a random access memory 16. The microprocessor 12, the ROM 15 and the RAM 16 can together be integrated into a single circuit 17 for forming a telephone when combined with the radio telephone module 10 and the other elements, but it will be understood by those skilled in the art that the various circuits shown can be partially deconstructed and combined in various integrated forms. In the EEPROM 15 there is shown a phone book 20, an unanswered calls register 21 and a set of user-settable parameters 22.

In operation, the radio telephone module 10 communicates with a radio telephone base station via the antenna 11 and receives calls from other parties (via fixed telephones or other mobile radio telephones). When a call is received by the radio telephone module 10, paging channel information received indicates to the radio telephone module 10 the telephone number of the calling party. The calling party has the option of withholding the calling number, in which case the radio telephone module 10 receives an indication that the calling party number (caller ID) is withheld. When the radio telephone module 10 receives the incoming call, this is presented to the microprocessor 12 as an event, and all information regarding the incoming call is provided to the microprocessor 12, including the caller ID or the withholding of the caller ID.

The microprocessor 12 has a software program that determines the disposition of an incoming call. For example, the microprocessor 12 can cause a ring tone to be generated or can generate a vibrate signal or can divert the call to voicemail or perform other functions. In the case of user input being required, the caller's name or number is displayed on the display 13 to allow the user to make an informed choice as to whether to answer the call, and the user can answer the call using keypad 14 or some other off-hook activation switch. The microprocessor 12 stores information regarding the incoming call in an incoming call register, including the caller ID and any other relevant information such as time and date of receipt. If the incoming call is unanswered (whether or not it is diverted to voicemail), this information is stored in the unanswered calls register 21. The phone book 20 stores telephone numbers and names for personal contacts required by the user of the telephone, for ease of retrieval and dialling of these numbers. When a call is received, the phone book 20 is searched for a match for the caller ID and if a match is found, the corresponding name in the phone book 20 is displayed in display 13. These various features of the software program described so far are commonplace in existing mobile telephone software.

Operation of the microprocessor 12 is in part determined by user-settable parameters 22 stored in ROM 15. Examples of user-settable parameters are: the selection of ring tone, the delay before switching to voicemail, etc. These operations of the microprocessor are independent of user input.

In addition to storing names and numbers, phone book 20 stores group attributes for individual entries in the phone book. For example, a group can be created for personal contacts, a group for business contacts and a third group for emergency contacts. It is possible for a telephone number to belong to more than one group. For example a spouse's number may belong to both the emergency and personal groups. Groups can be given priorities for call handling. The preferred groups and priorities are:

1. emergency—highest priority
2. business and personal—equal medium priority
3. unknown—lowest priority.

Figure 2:
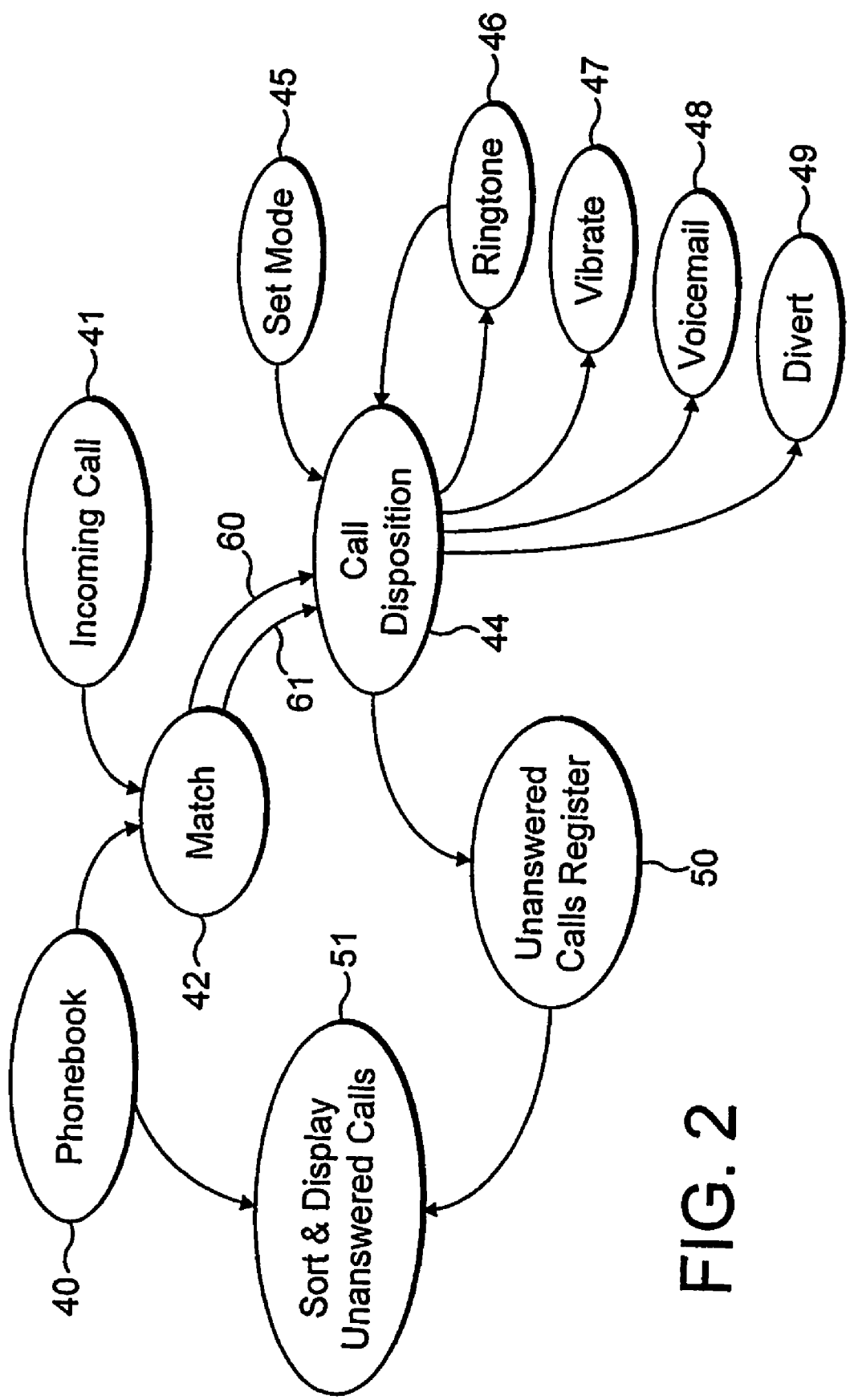
FIG. 2 is a process flow diagram illustrating operation of software running in the microprocessor of FIG. 1.

FIG. 2 illustrates operation of the software in microprocessor 12 in the course of receipt of an incoming call. FIG. 2 shows that microprocessor 12 runs a number of processes, including a phone book process 40, an incoming call process 41, a matching process 42, call disposition process 44, a set mode process 45, ring tone vibrate, voicemail and divert processes 46 to 49, an unanswered calls register process 50 and a sort and display unanswered calls process 51.

In operation, a user can initiate the phone book process 40 to manually enter telephone numbers and corresponding names into the phone book 20. When a call is received, the radio telephone module 10 informs the microprocessor 12 that an incoming call is being received, and the microprocessor 12 searches (process 42) for a match between the caller ID received within the incoming call (if any) and the telephone numbers in the phone book 20. Note that in this matching process, leading digits in the telephone number are not critical, as these may vary according to country codes and area codes. If there is a match identified, the match process 42 delivers to the call disposition process 44 an index 60 identifying an index in the phone book 20 where the details of this calling party can be found and a group attribute 61. If there is no match, the matching process 42 simply delivers to the call disposition process 44 the information that the calling party has withheld the caller ID.

In a separate process, a user can select a mode of operation for the telephone at any given time. Examples of modes of operation include:

no calls emergency calls only business and emergency calls personal and emergency calls business, personal and emergency calls all calls any combination of available groups, the above list of combinations being a set of representative examples.

The mode is selected in the set mode process 45 by the user activating a menu function using the keypad 14, causing the microprocessor 12 to display a menu on the display 13 and scrolling through that menu using the keypad 14 to select the desired mode.

The call disposition process 44 takes its inputs from the matching process 42 and the set mode process 45 and, using both these inputs, selects a disposition for the call. The call disposition selected may be one of the ring tone function 46, the vibrate function 47, the voicemail function 48 or the divert function 49. There may be alternative options not shown, or sub-selections within these functions. For example, there may be several ring tones selectable in ring tone process 46 or several outgoing voicemail messages in voicemail process 48, or several alternative destination numbers to which the divert process 49 can divert the incoming call. The details by which the call disposition process 44 makes a selection for the disposition of a call are described below. Upon selection of a particular disposition (e.g. ring tone 46) the process may return to process 44, for example in the event that a call is unanswered, whereupon call disposition process 44 can select a secondary call disposition (e.g. voicemail 48). If a call is unanswered, the caller ID (or the index of the calling party in the phone book 40) is registered in unanswered calls register 21. Process 51, when selected, sorts and displays the unanswered calls on the display 13, drawing the names or other necessary information from phone book 40 for display to the user.

Examples are now given of various scenarios. Six scenarios are given, each scenario representing a pre-settable mode of operation in the telephone. In each scenario, there are four calling groups. For each scenario and for each calling group an action or disposition is described. In these tables, "MS" stands for "mobile station" and refers to the telephone device.

TABLE 1

No Calls Scenario:

| Calling Group | Action on Incoming Call |
|---|---|
| Emergency | Mute ringer, disable vibration alert. Drops to Voicemail or diverts to chosen alternative number. MS records number as unanswered. |
| Business | Drops to Voicemail or diverts to chosen alternative number. MS records number as unanswered. |
| Personal | Drops to Voicemail or diverts to chosen alternative number. MS records number as unanswered. |
| Unknown | Drops to Voicemail. MS records number as unanswered. |

TABLE 2

Emergency Only Scenario:

| Calling Group | Action on Incoming Call |
|---|---|
| Emergency | MS behaves normally using chosen ringer and vibration alert settings etc. |
| Business | Drops to Voicemail or diverts to chosen alternative number. MS records number as unanswered. |
| Personal | Drops to Voicemail or diverts to chosen alternative number. MS records number as unanswered. |
| Unknown | Drops to Voicemail. MS records number as unanswered. |

TABLE 3

Business + Emergency Scenario:

| Calling Group | Action on Incoming Call |
|---|---|
| Emergency | MS behaves normally using chosen ringer and vibration alert settings etc. |
| Business | MS behaves normally using chosen ringer and vibration alert settings etc. |
| Personal | Drops to Voicemail or diverts to chosen alternative number. MS records number as unanswered. |
| Unknown | Drops to Voicemail. MS records number as unanswered. |

TABLE 4

Personal + Emergency Scenario:

| Calling Group | Action on Incoming Call |
|---|---|
| Emergency | MS behaves normally using chosen ringer and vibration alert settings etc. |
| Business | Drops to Voicemail or diverts to chosen alternative number. MS records number as unanswered. |
| Personal | MS behaves normally using chosen ringer and vibration alert settings etc. |
| Unknown | Drops to Voicemail. MS records number as unanswered. |

TABLE 5

Business + Personal + Emergency Scenario:

| Calling Group | Action on Incoming Call |
|---|---|
| Emergency | MS behaves normally using chosen ringer and vibration alert settings etc. |
| Business | MS behaves normally using chosen ringer and vibration alert settings etc. |
| Personal | MS behaves normally using chosen ringer and vibration alert settings etc. |
| Unknown | Drops to Voicemail. MS records number as unanswered. |

TABLE 6

All Calls Scenario:

| Calling Group | Action on Incoming Call |
|---|---|
| Emergency | MS behaves normally using chosen ringer and vibration alert settings etc. |
| Business | MS behaves normally using chosen ringer and vibration alert settings etc. |
| Personal | MS behaves normally using chosen ringer and vibration alert settings etc. |
| Unknown | MS behaves normally using chosen ringer and vibration alert settings etc. |

A pseudo-code representation of the above method is shown below:

```
If (phonebook_lookup(incoming_number))=NUMBER_IS_UNKNOWN
    {
    group=Highest_Priority_Group_Belonged_To(incoming_number);
    } else
    {
    group=UNKNOWN;
    }
case group is
    EMERGENCY:    {   case current_mode is
                      NO_CALLS : divert_call
                      Else accept_call;
                      end case;
                  }
    BUSINESS:     {   case current_mode is
                      NO_CALLS or
                      EMERGENCY+PERSONAL or
                      EMERGENCY_ONLY : divert_call
                      Else accept_call;
                      end case;
                  }
    PERSONAL:     {   case current_mode is
                      NO_CALLS or
                      EMERGENCY+BUSINESS or
                      EMERGENCY_ONLY : divert_call
                      Else accept_call;
                      end case;
                  }
    UNKNOWN:      {   case current_mode is
                      ALL_CALLS : accept_call
                      Else divert_call;
                  }
end case.
```

In accordance with a further feature of the preferred embodiment of the invention, the sort and display process 51 sorts any unanswered calls according to group. The groups are given a hierarchical order of priority and calls from the highest priority group are displayed first. The group priorities are set out above.

In a particularly preferred embodiment, the emergency, business and personal groups each have a selectable diversion number (which could be the same number) which can be applied to incoming calls for that group when that group is disabled.

There now follows an example of some phone book entries for illustrating operation of the invention. In this example, there are three phone book entries as follows:
    {"01234 567890" "Alan", "p"}
    {"02345 678875" "Mark", "pb"}
    {"06235 863487" "Wife", "pe"}

In this example, three alternative modes are selectable, these being personal, business and business or emergency. If the current mode is set to personal, then a call from any of the above numbers would result in a match to the (p) group. If the current mode is set to business, then only a call from Mark would be allowed through and the others would be redirected or forwarded to voicemail depending on the user's preference. If the current mode is set to business or emergency, then incoming calls from Mark and Wife would be allowed through successfully. This is illustrated in Table 7.

TABLE 7

|  | Personal or Emergency | Business or Emergency | Emergency only | Personal | All calls |
|---|---|---|---|---|---|
| Personal (p) | Accept | Voicemail or divert | Voicemail or divert | Accept | Accept |
| Business (b) | Voicemail or divert | Accept | Voicemail or divert | Accept | Accept |
| Emergency (e) | Accept | Accept | Accept | Accept | Accept |
| Unknown (u) | Voicemail | Voicemail | Voicemail | Voicemail | Accept |

Table 7 has five columns and four rows. The five columns represent different modes of operation, and the four rows represent four different categories of group. A user sets the desired disposition for a particular group in a particular mode. Thus, for example in the business or emergency mode, only calls from a business group or the emergency group are accepted, while in emergency only mode, calls from the emergency group only are accepted. When a call is "accepted" an alert is generated to the user. The nature of the alert (selected ring tone, vibrate, flashing alert) can be specified in Table 7 or can depend upon some other user setting. When a call is not accepted, the choice of voicemail or divert can be pre-set in Table 7 or can be determined by some other over-riding setting. Table 7 can provide greater detail as to the particular voicemail or divert function required (e.g. the particular outgoing message for the particular destination telephone number). Table 7 can be stored in the user settable parameters area 22 of the EEPROM 15 as a look-up alternative to the pseudocode set out above.

Table 8 illustrates the disposition of calls from different users that flows from Table 7. Table 8 is not a table that is stored in the telephone, but merely illustrates the outcome of the disposition of calls based upon the data in the phone book.

TABLE 8

|  | Personal or Emergency | Business or Emergency | Emergency only | Personal | All calls |
|---|---|---|---|---|---|
| Alan p | Accept | Voicemail or divert | Voicemail or divert | Accept | Accept |
| Mark p, b | Accept | Accept | Voicemail or divert | Accept | Accept |
| Wife p, e | Accept | Accept | Accept | Accept | Accept |

Other columns can be added to Table 7. For example, a "conference" mode could be added which would allow the user to select certain groups of caller to generate a vibrate alert when the user is in a conference and does not want audible alerts but does not want to switch calls to voicemail. Where there are alternatives shown in Table 7, one of these can either be set in the table itself (e.g. in emergency only mode, personal calls can be set to divert to voicemail while business calls are set to divert) or the options can be resolved by a further selectable global menu option.

It will be understood that the above description has been given by way of example only. For example, the various processes illustrated in FIG. 2 can be implemented in a variety of ways and need not necessarily be separated out in the manner described. Also, the exact flow of data between processes is not critical. For example; it does not matter where a particular data item is stored and whether particular processes index that storage location. Various modifications of detail can be made by one of ordinary skill in the art within the spirit and scope of the invention as set forth in the appended claims and equivalents thereof.

The invention claimed is:

1. A mobile radio telephone comprising:
    a memory having stored thereon phonebook items wherein each phonebook item identifies a party and a group attribute associated with the identified party, wherein the group attribute reflects a pre-defined relationship type between the identified party and a user of the mobile radio telephone;
    means for receiving a calling party identification for a received telephone call; and
    a controller configured to select a disposition of the received call, the controller comprising:
        means for selecting an operating mode from a plurality of operating modes comprising:
            a no calls operating mode,
            an emergency calls only operating mode,
            a business and emergency calls operating mode,
            a personal and emergency calls operating mode,
            a business, personal and emergency calls operating mode, and
            an all calls operating mode, wherein the plurality of operating modes are configured to control the disposition of at least one of a group of personal calls, a group of business calls, a group of emergency calls, and a group of unknown calls;
        means for comparing the received calling party identification with the phonebook items to identify a phonebook item matching the received calling party identification; and
        means for selecting a disposition for the received call based on the group attribute associated with the matching phonebook item and a present operating mode of the telephone.

2. The mobile radio telephone according to claim 1, wherein the memory is configured to store phonebook items in the form of individual telephone numbers and to store multiple group attributes for an individual telephone number.

3. The mobile radio telephone according to claim 2, wherein means for selecting a disposition for the received call comprises means for selecting a disposition for the received call in accordance with a hierarchy of prioritized dispositions for telephone numbers having multiple group attributes.

4. The mobile radio telephone according to claim 1 further comprising a radiotelephone receiver for receiving the telephone calls and the calling party identification.

5. The mobile radio telephone according to claim 4, further comprising an alert generator for alerting a user to an incoming call, wherein the means for selecting selectively activates the alert generator.

6. The mobile radio telephone according to claim 4, further comprising first and second alert generators for alerting a user to incoming calls, wherein the means for selecting selectively activates a selected one of the first and second alert generators.

7. The mobile radio telephone according to claim 4, further comprising a voice recorder, wherein the means for selecting selectively activates the voice recorder.

8. The mobile radio telephone according to claim 4, further comprising a user interface capable of presenting a plurality of optional modes to a user and selection means enabling a user to select and store a mode from the optional modes.

9. A method of handling incoming calls in a telephone device, comprising:
maintaining in the telephone device a store of telephone numbers that identify parties and associated group attributes, wherein the group attributes reflect a predefined relationship type between the identified party and a user of the telephone device;
receiving an incoming call with a caller identifier at the telephone device;
comparing the received caller identifier with the store of telephone numbers to identify the calling party; and
selecting a disposition of the incoming call at the telephone device based upon the group attribute for the telephone number matching the received caller identifier and on a present operating mode of the telephone device, wherein the present operating mode comprises a no calls operating mode, an emergency calls only operating mode, a business and emergency calls operating mode, a personal and emergency calls operating mode, a business, personal and emergency calls operating mode, and an all calls operating mode.

10. The method according to claim 9, wherein the operation of selecting a disposition comprises selecting a disposition from a set of alternative dispositions that includes alerting a user and switching to a message recording service.

11. The method according to claim 10 wherein the set of alternative dispositions includes generating an audible alert and generating a non-audible alert.

12. The method according to claim 10 wherein the set of alternative dispositions includes diverting the call to an alternative telephone number.

13. The method according to claim 10, wherein the operation of selecting a disposition of a call comprises selecting one of a hierarchical set of dispositions when a matching telephone number has more than one group attribute.

14. A non-transitory computer-readable medium having stored thereon computer-executable instructions configured to cause a processor of a telephone device to perform operations comprising:
maintaining in the telephone device a store of telephone numbers which identify a party and associated group attributes, wherein the group attributes reflects a predefined relationship type between the identified calling party and a user of the telephone device;
receiving an incoming call with a caller identifier;
comparing the received caller identifier with the store of telephone numbers to identify the calling party; and
selecting a disposition of the incoming call at the telephone device based upon the group attribute for the telephone number matching the received caller identifier and on a present operating mode of the telephone device, wherein the present operating mode comprises a no calls operating mode, an emergency calls only operating mode, a business and emergency calls operating mode, a personal and emergency calls operating mode, a business, personal and emergency calls operating mode, and an all calls operating mode.

15. The method of claim 9, wherein the present operating mode corresponds to a set of one or more of a plurality of telephone number groups that are configured to be active and one or more of the plurality of telephone number groups that are configured to be inactive,
wherein calls are permitted from callers with telephone numbers included within active telephone number groups,
wherein the group attribute of the matching telephone number indicates the telephone number group or groups to which the matching telephone number belongs.

16. The mobile radio telephone according to claim 1, wherein the controller is further configured to sort and display unanswered calls in a hierarchical order of priority based upon group priority, wherein the emergency group has a highest priority, business and personal groups have a medium priority, and unknown have a lowest priority.

17. The method according to claim 9, further comprising sorting and displaying unanswered calls in a hierarchical order of priority based upon group priority, wherein the emergency group has a highest priority, business and personal groups have a medium priority, and unknown have a lowest priority.

18. A non-transitory computer-readable medium according to claim 14, the stored computer-executable instructions are configured to cause the processor in the telephone device to perform operations further comprising:
sorting and displaying unanswered calls in a hierarchical order of priority based upon group priority, wherein the emergency group has a highest priority, business and personal groups have a medium priority, and unknown have a lowest priority.

19. The mobile radio telephone according to claim 1, wherein the controller is configured such that:
the no calls operating mode causes the mobile radio telephone to:
mute a ringer, disable vibration alert, drop the call to voicemail or divert to a chosen alternative number, and record the number as unanswered on the mobile radio telephone for calls having an emergency group attribute;
drop the call to voicemail or divert to a chosen alternative number, and record the number as unanswered on the mobile radio telephone for calls having personal or business group attributes; and
drop the call to voicemail and record the number as unanswered on the mobile radio telephone for calls having an unknown group attribute;
the emergency calls only operating mode causes the mobile radio telephone to:
use chosen ringer and vibration alert settings, drop the call to voicemail or divert to a chosen alternative number, and record the number as unanswered on the mobile radio telephone for calls having an emergency group attribute;
drop the call to voicemail or divert to a chosen alternative number, and record the number as unanswered on the mobile radio telephone for calls having personal or business group attributes; and
drop the call to voicemail and record the number as unanswered on the mobile radio telephone for calls having an unknown group attribute;
the business and emergency calls operating mode operates to:
behave normally using chosen ringer and vibration alert settings for calls having emergency or business group attributes;
drop the call to voicemail or divert to a chosen alternative number, and record the number as unanswered on the mobile radio telephone for calls having a personal group attribute; and
drop the call to voicemail and record the number as unanswered on the mobile radio telephone for calls having an unknown group attribute;

the personal and emergency calls operating mode causes the mobile radio telephone to:
  behave normally using chosen ringer and vibration alert settings for calls having emergency or personal group attributes;
  drop the call to voicemail or divert to a chosen alternative number, and record the number as unanswered on the telephone for calls having a business group attribute; and
  drop the call to voicemail and record the number as unanswered on the mobile radio telephone for calls having an unknown group attribute;
the business, personal and emergency calls operating mode causes the mobile radio telephone to:
  behave normally using chosen ringer and vibration alert settings for calls having emergency, personal or business group attributes; and
  drop the call to voicemail and record the number as unanswered on the mobile radio telephone for calls having an unknown group attribute; and
the all calls operating mode causes the mobile radio telephone to behave normally using chosen ringer and vibration alert settings for all calls.

20. The method according to claim 9, wherein:
the no calls operating mode is configured to cause the mobile radio telephone to:
  mute a ringer, disable vibration alert, drop the call to voicemail or divert to a chosen alternative number, and record the number as unanswered on the telephone for calls having an emergency group attribute;
  drop the call to voicemail or divert to a chosen alternative number, and record the number as unanswered on the telephone for calls having personal or business group attributes; and
  drop the call to voicemail and record the number as unanswered on the telephone for calls having an unknown group attribute;
the emergency calls only operating mode is configured to cause the mobile radio telephone to:
  use chosen ringer and vibration alert settings, drop the call to voicemail or divert to a chosen alternative number, and record the number as unanswered on the telephone for calls having an emergency group attribute;
  drop the call to voicemail or divert to a chosen alternative number, and record the number as unanswered on the telephone for calls having personal or business group attributes; and
  drop the call to voicemail and record the number as unanswered on the telephone for calls having an unknown group attribute;
the business and emergency calls operating mode is configured to cause the mobile radio telephone to:
  behave normally using chosen ringer and vibration alert settings for calls having emergency or business group attributes;
  drop the call to voicemail or divert to a chosen alternative number, and record the number as unanswered on the telephone for calls having a personal group attribute; and
  drop the call to voicemail and record the number as unanswered on the telephone for calls having an unknown group attribute;
the personal and emergency calls operating mode is configured to cause the mobile radio telephone to:
  behave normally using chosen ringer and vibration alert settings for calls having emergency or personal group attributes;
  drop the call to voicemail or divert to a chosen alternative number, and record the number as unanswered on the telephone for calls having a business group attribute; and
  drop the call to voicemail and record the number as unanswered on the telephone for calls having an unknown group attribute;
the business, personal and emergency calls operating mode is configured to cause the mobile radio telephone to:
  behave normally using chosen ringer and vibration alert settings for calls having emergency, personal or business group attributes; and
  drop the call to voicemail and record the number as unanswered on the telephone for calls having an unknown group attribute; and
the all calls operating mode is configured to cause the mobile radio telephone to behave normally using chosen ringer and vibration alert settings for all calls.

21. The non-transitory computer-readable medium according to claim 14, the computer-executable instructions further configured to cause the processor in the telephone device to perform operations comprising:
  muting a ringer, disabling vibration alert, dropping the call to voicemail or diverting to a chosen alternative number, and recording the number as unanswered on the telephone for calls having an emergency group attribute when operating in the no calls operating mode;
  dropping the call to voicemail or divert to a chosen alternative number, and recording the number as unanswered on the telephone for calls having personal or business group attributes when operating in the no calls operating mode; and
  dropping the call to voicemail and record the number as unanswered on the telephone for calls having an unknown group attribute when operating in the no calls operating mode;
  using chosen ringer and vibration alert settings, dropping the call to voicemail or diverting to a chosen alternative number, and recording the number as unanswered on the telephone for calls having an emergency group attribute when operating in the emergency calls only operating mode;
  dropping the call to voicemail or diverting to a chosen alternative number, and recording the number as unanswered on the telephone for calls having personal or business group attributes when operating in the emergency calls only operating mode; and
  dropping the call to voicemail and recording the number as unanswered on the telephone for calls having an unknown group attribute when operating in the emergency calls only operating mode;
  behaving normally using chosen ringer and vibration alert settings for calls having emergency or business group attributes when operating in the business and emergency calls operating mode;
  dropping the call to voicemail or diverting to a chosen alternative number, and recording the number as unanswered on the telephone for calls having a personal group attribute when operating in the business and emergency calls operating mode; and
  dropping the call to voicemail and record the number as unanswered on the telephone for calls having an unknown group attribute when operating in the business and emergency calls operating mode;

behaving normally using chosen ringer and vibration alert settings for calls having emergency or personal group attributes when operating in the personal and emergency calls operating mode;

dropping the call to voicemail or diverting to a chosen alternative number, and recording the number as unanswered on the telephone for calls having a business group attribute when operating in the personal and emergency calls operating mode; and dropping the call to voicemail and recording the number as unanswered on the telephone for calls having an unknown group attribute when operating in the personal and emergency calls operating mode;

behaving normally using chosen ringer and vibration alert settings for calls having emergency, personal or business group attributes when operating in the business, personal and emergency calls operating mode; and dropping the call to voicemail and recording the number as unanswered on the telephone for calls having an unknown group attribute when operating in the business, personal and emergency calls operating mode; and behaving normally using chosen ringer and vibration alert settings for all calls when operating in the all calls operating mode.

* * * * *